(12) United States Patent
Lee

(10) Patent No.: US 8,612,663 B1
(45) Date of Patent: Dec. 17, 2013

(54) INTEGRATED CIRCUIT DEVICES, SYSTEMS AND METHODS HAVING AUTOMATIC CONFIGURABLE MAPPING OF INPUT AND/OR OUTPUT DATA CONNECTIONS

(75) Inventor: Whay Sing Lee, Milpitas, CA (US)

(73) Assignee: Netlogic Microsystems, Inc., Santa Clara, CA (US)

( * ) Notice: Subject to any disclaimer, the term of this patent is extended or adjusted under 35 U.S.C. 154(b) by 168 days.

(21) Appl. No.: 13/192,381

(22) Filed: Jul. 27, 2011

(51) Int. Cl.
*G06F 13/00* (2006.01)
(52) U.S. Cl.
USPC .......................................... 710/317; 710/316
(58) Field of Classification Search
USPC .......................................... 710/317, 305, 316
See application file for complete search history.

(56) References Cited

U.S. PATENT DOCUMENTS

| | | |
|---|---|---|
| 6,862,293 B2 | 3/2005 | Lay et al. |
| 6,961,347 B1 | 11/2005 | Bunton et al. |
| 7,012,935 B2 | 3/2006 | Woelk et al. |
| 7,305,047 B1 | 12/2007 | Turner |
| 7,490,189 B2 | 2/2009 | Eberle et al. |
| 7,557,605 B2 | 7/2009 | D'Souza et al. |
| 7,719,449 B2 | 5/2010 | Fahmi et al. |
| 7,805,577 B1 | 9/2010 | Mattina et al. |
| 2004/0151197 A1 | 8/2004 | Hui |
| 2005/0013311 A1* | 1/2005 | Samudrala et al. ........... 370/412 |
| 2006/0165112 A1* | 7/2006 | Varma ........................... 370/428 |
| 2007/0263533 A1 | 11/2007 | Chiabrera |
| 2008/0143379 A1 | 6/2008 | Norman |

OTHER PUBLICATIONS

Netlogic Microsystems, Inc., NLP1042 / NLP1342 Software Programming Guide, pp. 8-9, for device on sale no later than Jul. 26, 2010.

* cited by examiner

*Primary Examiner* — Glenn A Auve
(74) *Attorney, Agent, or Firm* — Sterne, Kessler, Goldstein & Fox P.L.L.C.

(57) ABSTRACT

Integrated circuit devices are disclosed with receive ports having mapping circuits automatically configurable to change a logical mapping of data received on receive-data connections. Automatic configuration can be based on a data value included within a received data set. Corresponding systems and methods are also described.

16 Claims, 13 Drawing Sheets

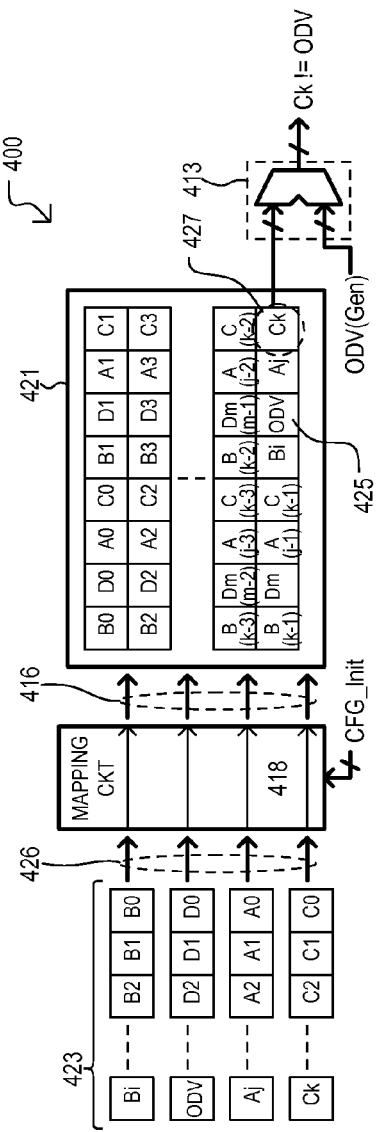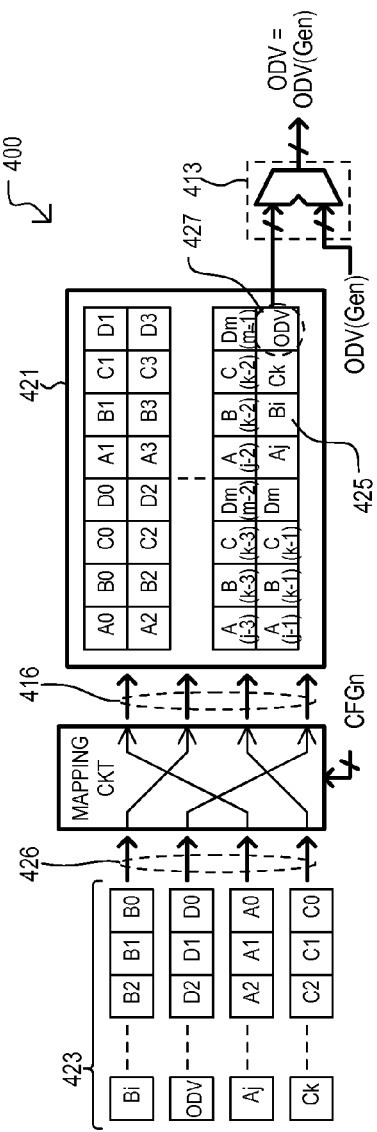

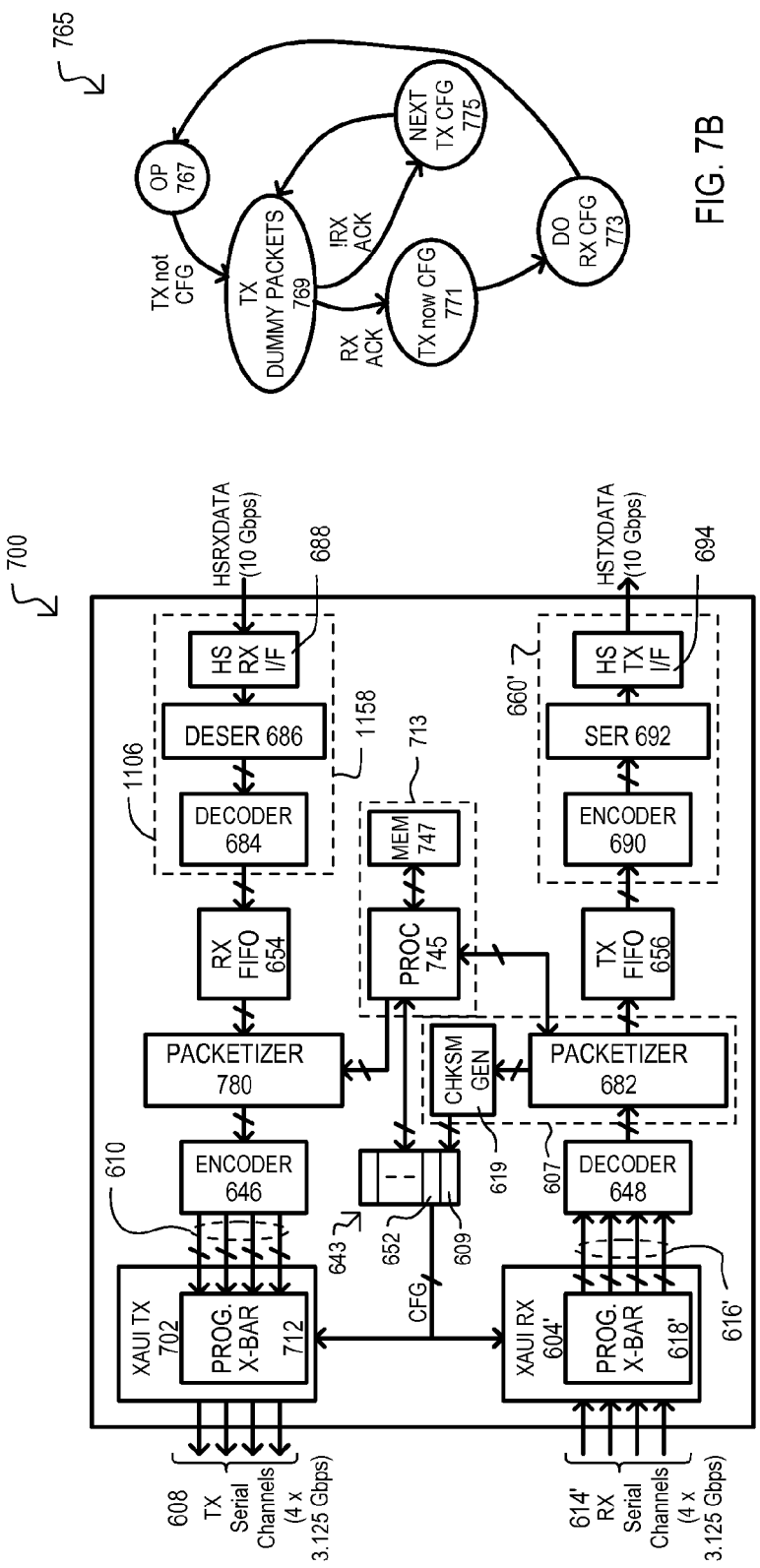

```
1   while (not yet seen "msg1 msg2 msg3 msg4" nor "msg5 msg6 msg7 msg8") {
2        transmit "msg1 msg2 msg3 msg4"
3        manipulate RX mapper
4   }
5   while (not yet seen "msg5 msg6 msg7 msg8" nor regular traffic) {
6        transmit "msg5 msg6 msg7 msg8"
7        manipulate TX mapper
8   }
9   Commence regular traffic
```
FIG. 8A
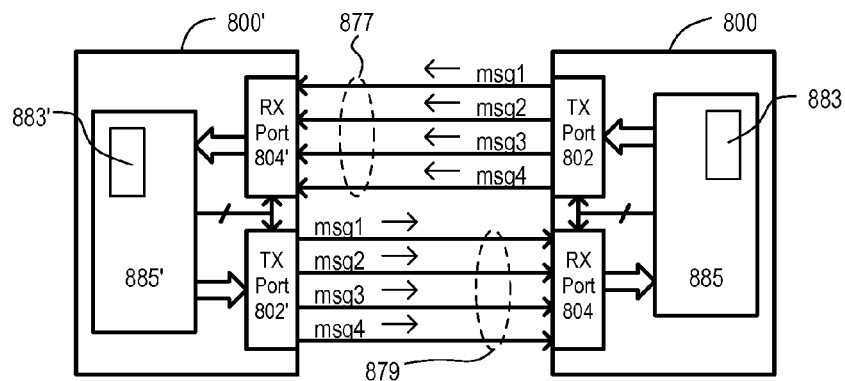
FIG. 8B
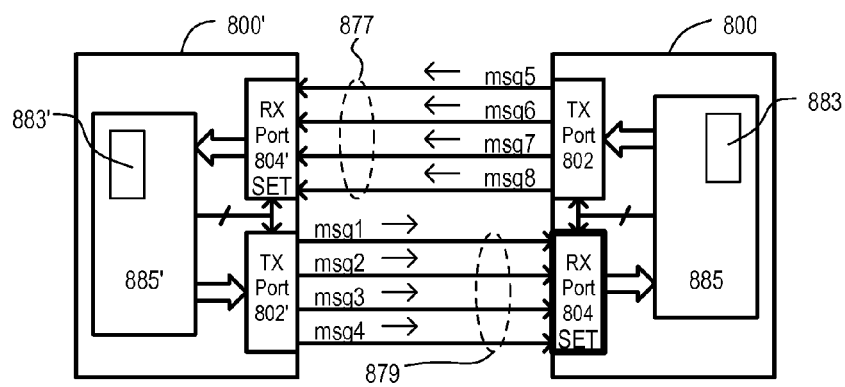
FIG. 8C
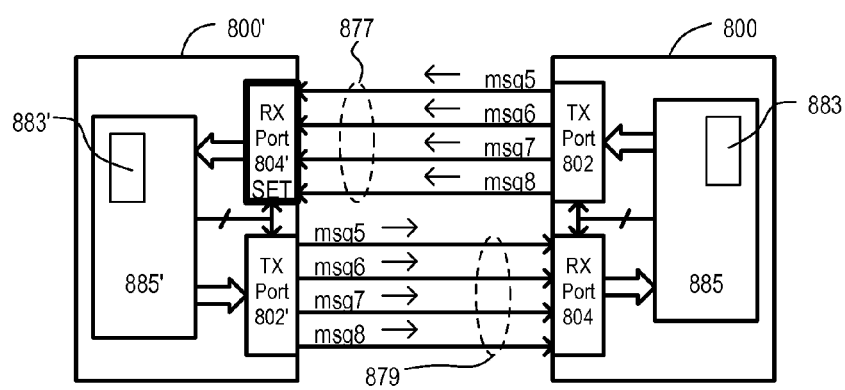
FIG. 8D

INTEGRATED CIRCUIT DEVICES, SYSTEMS AND METHODS HAVING AUTOMATIC CONFIGURABLE MAPPING OF INPUT AND/OR OUTPUT DATA CONNECTIONS

TECHNICAL FIELD

The present disclosure relates generally to integrated circuits, and more particularly to integrated circuits and systems in which data is transmitted and/or received on multiple connections.

BRIEF DESCRIPTION OF THE DRAWINGS

FIGS. 4A and 4B are block diagrams showing an IC and configuration check operation according to an embodiment.

FIGS. 7A and 7B are diagrams showing an IC device according to one embodiment having automatically reconfigurable XAUI RX and TX ports.

FIGS. 8A to 8J are block schematic diagrams showing systems according to various embodiments having one or more automatically reconfigurable ports.

DETAILED DESCRIPTION

Figure 1A:
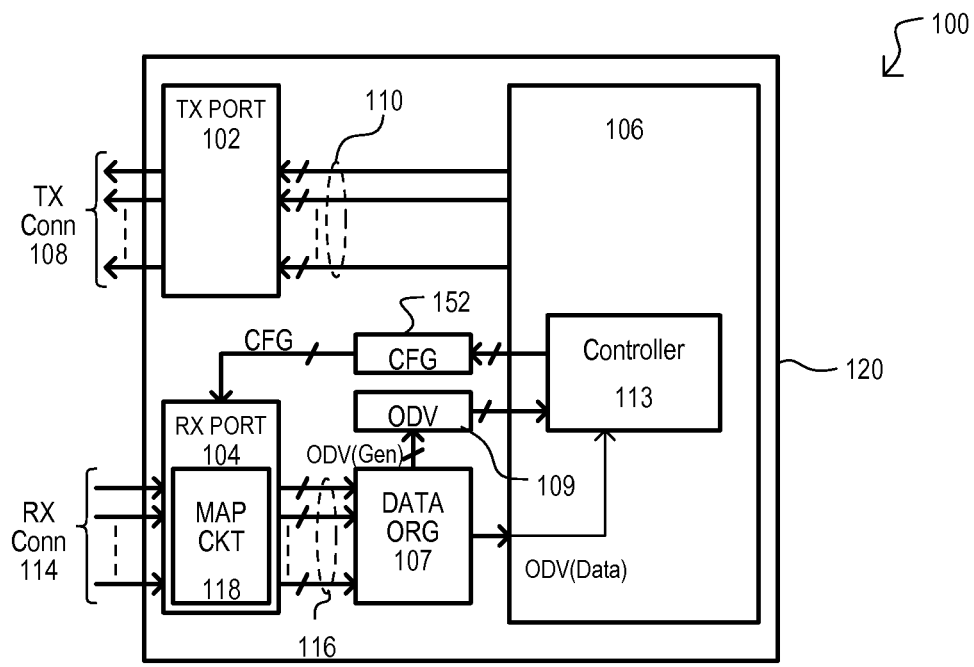
FIGS. 1A and 1B are diagrams showing an integrated circuit (IC) device according to one embodiment having an automatically reconfigurable receive (RX) port.

Various embodiments will now be described that show circuits, integrated circuit (IC) devices, systems and corresponding methods that can automatically map external device input and/or output connections to internal data buses according to any of a number of different configurations. Particular embodiments can map multiple external serial data connections of an IC device to corresponding internal parallel data buses, thus enabling the device to accommodate various circuit board trace configurations, which in very particular embodiments, can include high speed, serial, point-to-point connections.

In the following descriptions, like sections are referred to with the same reference character but with a first digit(s) corresponding to the figure number.

Referring now to FIG. 1A, an IC device according to a first embodiment is shown in a block schematic diagram and designated by the general reference character 100. An IC device 100 can include a transmit (TX) port 102, a receive (RX) port 104, processing logic 106, a data organizer 107, an organizer store 109, and a configuration store 152. In a particular embodiment, the above noted sections (102, 104, 106, 107, 109, 111) may form part of a same integrated circuit substrate 120.

In response to data received on first internal data lanes 110, a TX port 102 can output data on TX data connections 108. TX data connections 108 can include multiple physical connections of the IC device 100, including but not limited to pins, pads, solder balls, or any other suitable equivalent for providing an external connection for an IC device.

In the embodiment shown, each of TX data connection 108 can transmit a separate serial stream of data, where such separate streams have a logical organization that spans all TX data connections 108. Accordingly, in order for valid data transmission to take place, the logical order of serial data streams emitted by TX data connections 108 should match that of another device (not shown) receiving such transmissions. Very particular examples of such a logical organization will be described in more detail below.

Unlike TX data connections 108, first internal data lanes 110 may carry data output from processing logic 106 in parallel and not serial form. In some embodiments, first internal data lanes 110 can include multiple lanes, each of which is composed of a multi-bit parallel data bus. Parallel data on internal data lanes 110 can be output as serial data on corresponding TX connections 108 by operation of TX port 102. Accordingly, there may be at least as many first internal data lanes 110 as TX connections 108, and in particular embodiments, the number of first internal data lanes 110 can match the number of TX connections 108.

An RX port 104 can receive input data on RX data connections 114, and in response, output data on second internal data lanes 116. An RX port 104 can include a mapping circuit 118. As in the case of TX data connections 108, RX data connections 114 can include multiple physical connections to the IC device 100, including but not limited to pins, pads, solder balls, or any other suitable external connection for an IC device.

Data received on RX port 104 can have a logical organization, and may include a value referred to herein as an "organization dependent value" ODV. An ODV can be a value that depends upon a logical order of data within a data set that is received on RX data connections 114. It is understood that an ODV can be generated beforehand (e.g., by circuits in a second device sending the data set), and transmitted with the data set for reception on multiple RX data connections 114.

Each RX data connection 114 can receive a separate serial stream of data, where such streams can have a logical organization that spans all RX data connections 114, as described for the TX port 102 above. Second internal data lanes 116 may include multiple lanes, each of which is composed of a multi-bit, parallel data bus. Mapping circuit 118 can be programmed to map each RX data connection 114 to one or more corresponding second internal data lanes 116, according to any of multiple configurations. Such mapping can be in response to configuration data stored in configuration store 152.

Data organizer 107 can be programmed to logically organize data according to how such data is received on data lanes 116. This can include storing received data so that all or selected portions of such data are accessible by a controller 113 within processing logic 106. It is understood that such received data can include an ODV, as described above, and such a value can be stored within data organizer 107. In addition, data organizer 107 can also be programmed to generate its own order dependent value (ODV(Gen)) from the received data. In one very particular embodiment, ODVs can be a checksum values (e.g., error check codes) for a data set. An organizer store 109 can store the generated ODV (ODV (Gen)) for access by controller 113.

Processing logic 106 can provide data for transmission from the IC device 100 via TX port 102, and can operate on data received from RX port 104. In the particular embodiment shown, processing logic 106 can include a controller 113. A controller 113 can read data from data organizer 107 and organizer store 109, and can write data to configuration store 152. A controller 113 may take the form of customized logic, a processor configured to execute instructions, programmable logic, and combinations thereof and equivalents. Thus, in some embodiments, the controller 113 operates in accordance with provided programming (e.g., firmware).

Figure 1B:
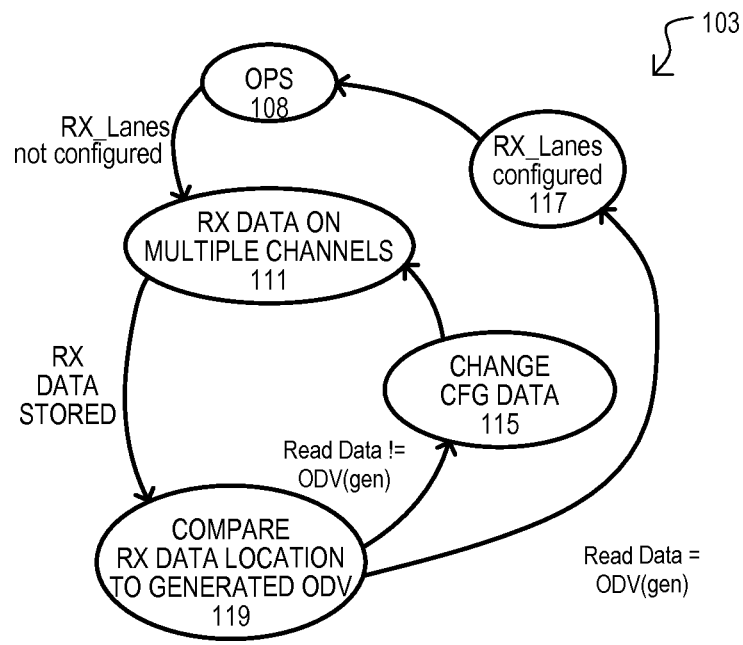

Referring now to FIG. 1B, a configuration for a controller like that shown as 113 is shown in a state diagram 103. A configuration 103 can include a state 108, which can be a predetermined operational state. In particular embodiments, such a state can precede configuration operations, and in very particular embodiments can include a power-on or reset state (POR). If it is determined that RX lanes are not configured (RX_Lanes not configured), a controller can wait for the reception of data on multiple channels (111). If received data are received and stored (RX DATA STORED), read data at a storage location can be compared to a generated ODV (119). Such an action can include reading data from one of many locations storing the received data, and comparing data at such a location to an ODV generated from the received data.

If the read data value does not match the ODV (Read Data !=ODV(gen)), configuration data can be changed (115), and operations can return to 111. It is understood that changing configuration data can alter a logical order of the data received. If the read data value matches the ODV (Read Data=ODV(gen)), receive lanes are determined to be configured (117), and an operation can return to a state 108.

It is understood that while FIG. 1 depicts three or more TX and RX data connections, alternate embodiments can include as few as two TX or RX data connections, or four or more TX or RX data connections.

In this way, an IC device may reconfigure a logical order of input connections in response to an order dependent value included in a received set of data.

Figure 2:
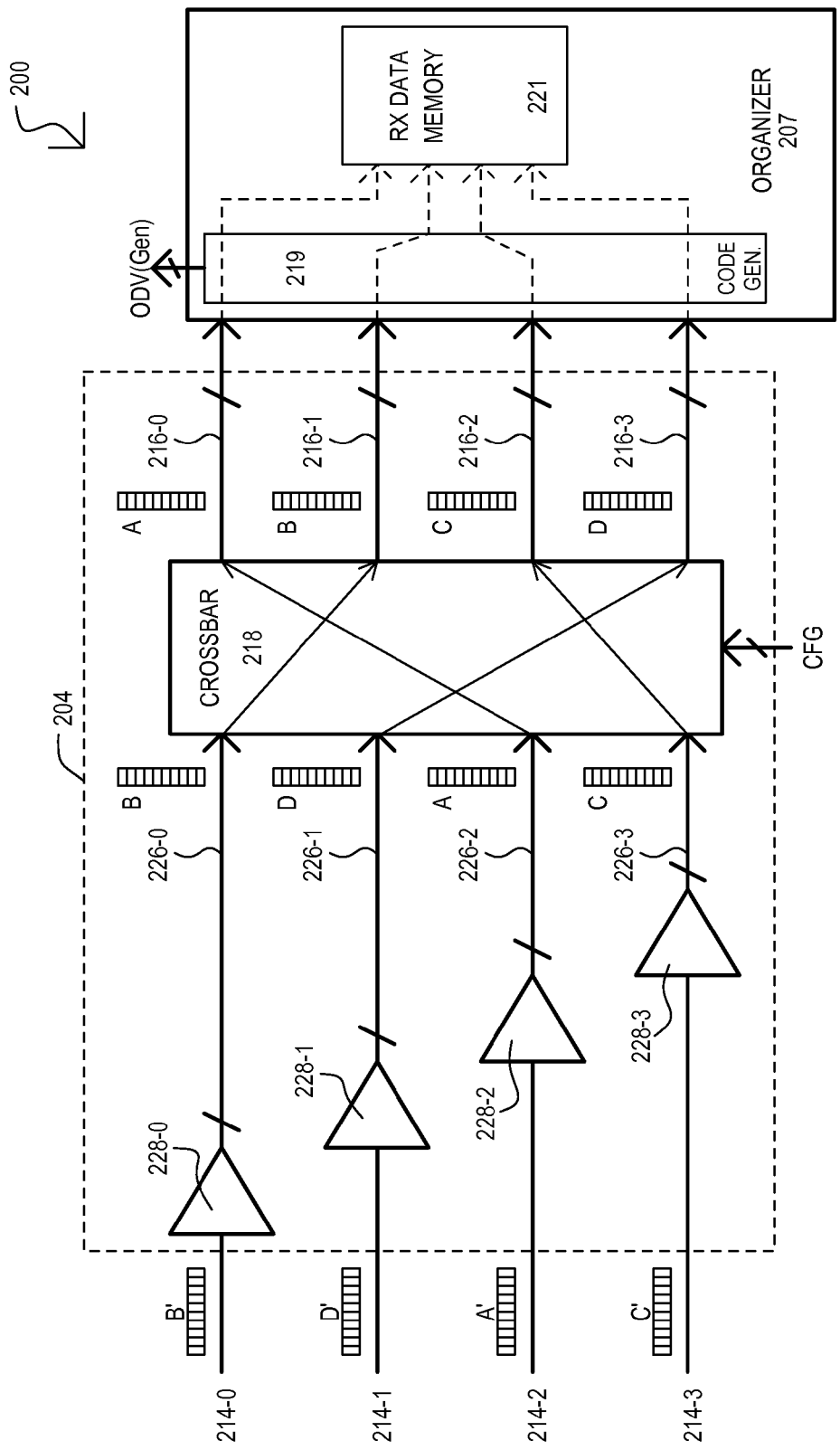
FIG. 2 is a block schematic diagram of an IC device according to another embodiment having an automatically reconfigurable RX port with de-serialization on multiple data paths.

Referring now to FIG. 2, an IC device according to a further embodiment is shown in a block schematic diagram and designated by the general reference character 200. An IC device 200 can include an RX port 204 and data organizer 207. RX port 204 can be one very particular implementation of all or part of RX port shown as 104 in FIG. 1A. Similarly, data organizer 207 can be one implementation of that shown as 107 in FIG. 1A.

RX port 204 can receive data, in serial form, on RX connections 214-0 to -3, and output data in parallel form on second internal data lanes 216-0 to -3. RX connections (214-0 to -3) can take the form of those shown as 114 in FIG. 1A, or an equivalent. A RX port 204 can include de-serializing circuits 228-0 to -3, mapping circuit 218, and input data lanes 226-0 to -3. De-serializing circuits (228-0 to -3) can each have an input connected to an RX connection (214-0 to -3) and an output connected to an input data lane (226-0 to -3). Each de-serializing circuit (228-0 to -3) can convert a serial data value on its corresponding RX connection (214-0 to -3) into a parallel data value that is output on the corresponding input data lane (226-0 to -3). FIG. 2 shows received serial data B', D', A', C' converted into corresponding parallel data values B, D, A and C, respectively.

Input data lanes (226-0 to -3) can each include a multi-bit data bus for receiving data in parallel from de-serializing circuits (228-0 to -3). In some embodiments, a bus width of each second internal data lane (216-0 to -3) is no smaller than that of each input data lane (226-0 to -3). Further, the number of second internal data lanes (216-0 to -3) can be equal to or greater than the number of input data lanes (226-0 to -3). In the embodiment shown, each of second internal data lanes (216-0 to -3) and input data lanes (226-0 to -3) can be a unidirectional, multi-bit data bus.

In one embodiment, mapping circuit 218 can map each of input data lanes (226-0 to -3) to a second internal data lane (216-0 to -3) according to any of multiple permutations, based on received configuration data CFG. In a particular embodiment, a mapping circuit 218 can map each of input data lanes (216-0 to -3) to any of the second internal data lanes (216-0 to -3). In the embodiment shown, a mapping circuit 218 can be a "crossbar" circuit. Further, the mapping circuit 218 has changed the logical order from B, D, A, C to A, B, C, D.

A data organizer 207 can include a code generator circuit 219 and a receive data memory 221. A code generator circuit 219 can generate an order-dependent value ODV(Gen) from data received on second internal data lanes (216-0 to -3). In one embodiment, a code generator circuit 219 can generate an ODV by operating on data values as received on particular data lanes. In a very particular embodiment, data may be received as data bytes on each of second internal data lanes (216-0 to -3), and a code generator circuit 219 can generate an error check code (as the ODV(Gen) value) from such data bytes.

A receive data memory 221 can store data received on second internal data lanes (216-0 to -3) according to an order of such data lanes.

Figure 3:
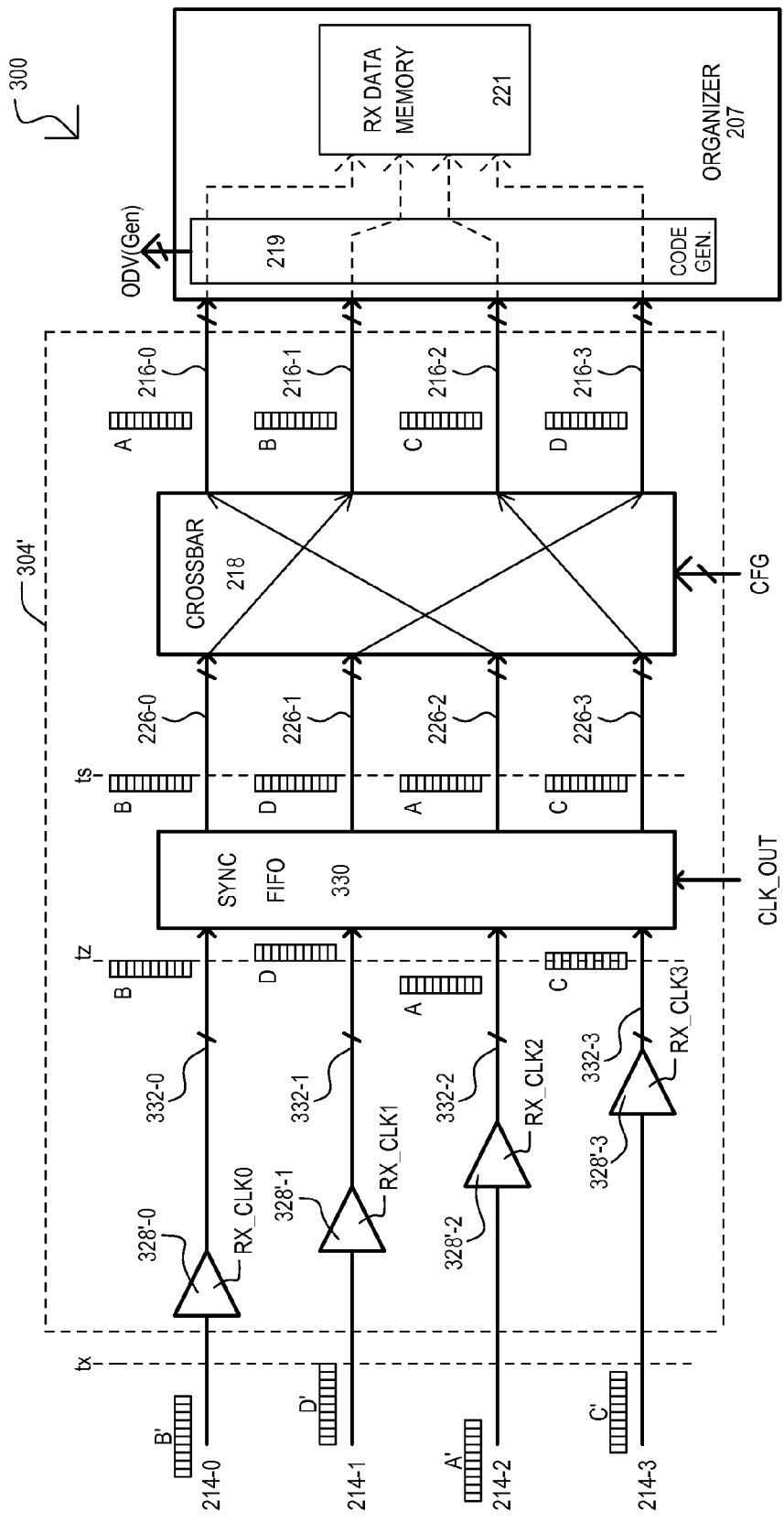
FIG. 3 is a block schematic diagram of an IC device according to another embodiment having an automatically reconfigurable RX port with synchronization of multiple data paths.

Referring now to FIG. 3, an IC device according to another embodiment is shown in a block schematic diagram and designated by the general reference character 300. An IC device 300 can include items like those of FIG. 2, including an RX port 304' and data organizer 207. RX port 304' can be one very particular implementation of all or part of RX port shown as 104 in FIG. 1A. Similarly, data organizer 207 can be one implementation of that shown as 107 in FIG. 1A.

FIG. 3 can differ from FIG. 2 in that an RX port 304' is shown to further include unsynchronized data lanes 332-0 to -3, synchronizing circuit 330, and de-serializer circuits 328'-0 to -3 that operate according to separate timing clocks (RX_CLK0 to RX_CLK3).

De-serializing circuits (328'-0 to -3) can each have an input connected to an RX connection (214-0 to -3) and an output connected to an unsynchronized data lane (332-0 to -3). Each de-serializing circuit (328'-0 to -3) can convert a serial data value on its corresponding RX connection (313-0 to -3) into a parallel data value as described in conjunction with FIG. 2. However, such conversion operations can occur according to separate timing clocks (RX_CLK0 to RX_CLK3). Thus, parallel data output from de-serializing circuits (328'-0 to -3) may not be synchronized with respect to one another. In some embodiments, timing clocks (RX_CLK0 to RX_CLK3) can be extracted from corresponding serial data streams. However, in other embodiments timing clocks (RX_CLK0 to RX_CLK3) can be signals generated from signal generators independent of the serial data, such as an oscillator or external clock signal, as but two examples.

FIG. 3 shows but one possible way in which de-serializing circuits (328'-0 to -3) can output unsynchronized parallel data values. FIG. 3 includes a representation of serial data arriving at different times on RX connection (214-0 to -3). Within their respective serial data streams, at a time tx, serial data D' can arrive, followed by C', followed by B' and then A' (i.e., skew exists between such serial data). De-serializing circuits (328'-0 to -3) can capture serial data according to timing of their respective timing clocks (RX_CLK0 to RX_CLK3). In the embodiment shown, a difference between timing clocks (RX_CLK0 to RX_CLK3) can correspond to the respective skew between serial data streams. As a result, data can be clocked out of their respective de-serializing circuits (328'-0 to -3) at different times. This is represented in FIG. 3 by the relative positions of data values B, D, A, C to a time tz.

Unsynchronized data lanes (332-0 to -3) can each include a multi-bit data bus for receiving data in parallel from de-serializing circuits (332-0 to -3) with a bus width no smaller than that of each input data lane (326-0 to -3).

Synchronizing circuit 330 can receive data values on unsynchronized data lanes (332-0 to -3), and output such data values in synchronism with one another on input data lanes (226-0 to -3). In the embodiment shown, a synchronizing circuit 330 is a first-in-first-out (FIFO) memory, which can input data on unsynchronized data lanes (332-0 to -3) according to different clock signals, and output such data values on input data lanes (226-0 to -3) according to an output clock CLK_OUT. Such a synchronization of data is represented in FIG. 3 by data values B, D, A, C being aligned with a time ts.

An IC 300 may otherwise operate like that shown in FIG. 3.

In this way, a receive port can include a synchronizing circuit that synchronizes data values on separate data lanes generated by de-serializing circuits.

Referring now to FIGS. 4A and 4B, an IC device and operation according to another embodiment is shown in a sequence of block diagrams. FIGS. 4A and 4B can be one particular implementation of any of those shown in FIGS. 1A to 3.

The embodiment of FIGS. 4A and 4B shows input data 423, a mapping circuit 418, a receive data memory 421, and a representation of a controller 413. FIG. 4A shows mapping circuit 418 that configures receive data paths according to initial configuration data (CFG_Init). FIG. 4A also shows a resulting storage of received data within receive data memory 421. Input data 423 can be distributed over input data lanes 426, and mapped to internal data lanes 416 as described in the embodiments herein or equivalents. Data values (B0 to ODV) on internal data lanes 416 can be stored in various predetermined locations (two shown as 425 and 427) within receive data memory 421, based upon an order of such internal data lanes 416.

A controller 413 can compare data at one predetermined location (in this case 427) to an order dependent value (ODV (Gen)) generated from input data 423 as described herein, or an equivalent. In example shown, the initial mapping of FIG. 4A results in an incorrect mapping of data, thus an ODV value included with input data 423 is stored at location 425 and not 427. Consequently, a comparison by controller 413 shows that the compared values do not match (Ck !=ODV(Gen)).

FIG. 4B shows the same device 400 with mapping circuit 418 configuring receive data paths according to follow-on configuration data (CFGn). FIG. 4B shows the resulting storage of received data within receive data memory 421. In example shown, the mapping of FIG. 4B results in a correct mapping of data, thus an ODV value included with input data 423 is stored at location 427, which is accessed by controller 413. Consequently, a comparison by controller 413 shows that the compared values match one another (ODV=ODV (Gen)).

It is understood that the particular data block numbering presented in FIGS. 4A and 4B is only illustrative. Data storage patterns and/or data storing techniques may be selected to be suitable to the particular circuits and protocol employed.

In this way, a controller can compare an order dependent value generated from a received data set to a storage location of a memory storing the data set to verify the data set has a correct logical order.

Figure 5A:
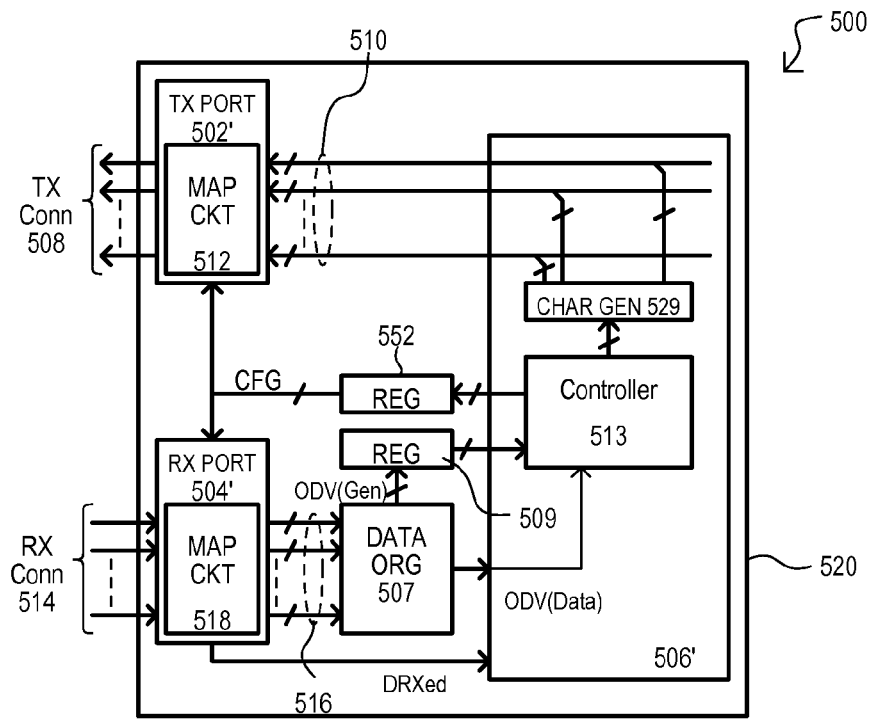
FIGS. 5A and 5B are diagrams showing an IC device according to an embodiment having automatically reconfigurable RX and TX ports.

Referring now to FIG. 5A, an IC device according to a further embodiment is shown in a block schematic diagram and designated by the general reference character 500. An IC device 500 can include sections like those shown in FIG. 1A, and such like sections are referred to by the same reference character, but with the first digit being a "5" instead of a "1".

FIG. 5A shows an embodiment that can automatically remap both RX and TX connections (508 and 514). Accordingly, FIG. 5A can differ from FIG. 1A in that it can include a TX port 502' having a second mapping circuit 512, an RX port 504' that can output a data received indication (DRXed), and processing logic 506' that can include a character generator 529.

A second mapping circuit 512 can be programmed to map each first internal data lane 510 to one or more corresponding TX data connections 508, according to any of multiple configurations. Such mapping can be in response to configuration data stored in configuration store 552. An RX port 504' can activate data received indication DRXed upon receiving valid data signals on RX data connections 514. A character generator 529 can generate predetermined data on first internal data lanes 510 to result in certain data being output on TX data connections 508.

Having described various portions of the IC device of FIG. 5A, one particular automatic configuration operation for TX data connections 508 will now be described. At the start of such a configuration operation, a controller 513 can cause character generator 529 to generate predetermined data on second internal data lanes 510 which can result in data being output on TX data connections 508 according to a mapping of second mapping circuit 512. In one very particular embodiment, such an action can result in a "dummy packet" (i.e., a packet having a data payload that may be disregarded) being transmitted over TX data connections 508.

If second mapping circuit 512 has a correct mapping between second internal data lanes 510 and TX data connections 508, a receiving device (not shown) can receive such data as a valid data transmission, and can attempt to transmit data to IC device 500 on RX data connections 514.

As TX port 502' transmits data in response to character generator 529, RX port 504' can monitor RX data connections 514. If valid input signals are not received on RX data connections 514, a controller 513 can write new configuration data to configuration store 552 to alter a mapping of second mapping circuit 512. Such changes in mapping can continue until RX port 504' detects valid input signals, and activates data received indication DRXed. An active data receive indication (DRXed) can signify that character generator 529 no longer needs to transmit data.

Figure 5B:
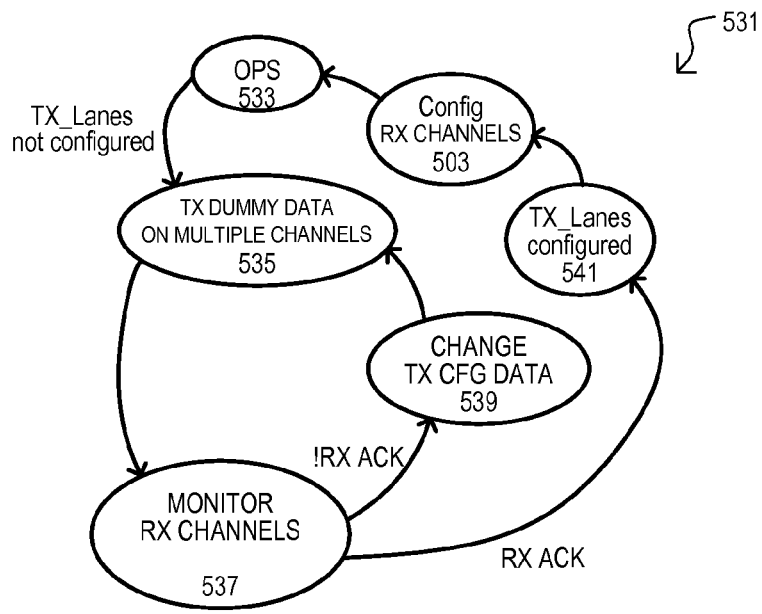

Referring now to FIG. 5B, a configuration for a controller like that shown as 513 is shown in a state diagram 531. A configuration 531 can include a state 533, which can be a predetermined operational state arising from a predetermined event. In particular embodiments, such a state can precede configuration operations, and in very particular embodiments can include a power-on or reset state (POR) that follows a power-on or reset event. If it is determined that TX lanes are not configured (TX Lanes not configured), a controller can cause the transmission of data on multiple channels (535). The controller can then monitor RX channels 537 to see if another device has started transmitting valid data on RX channels. If valid input signals are not received (!RX ACK), configuration data can be changed (539), thereby altering a logical mapping of the TX data lanes. The controller can then return to state 535. If, however, valid input signals are received (RX ACK), a determination can be made that the TX lanes are configured (541). The controller can then configure RX channels (503).

In this way, an IC device may reconfigure a logical order of output connections sending data to another device until valid data are received from such another device.

Figures 6A, 6B:
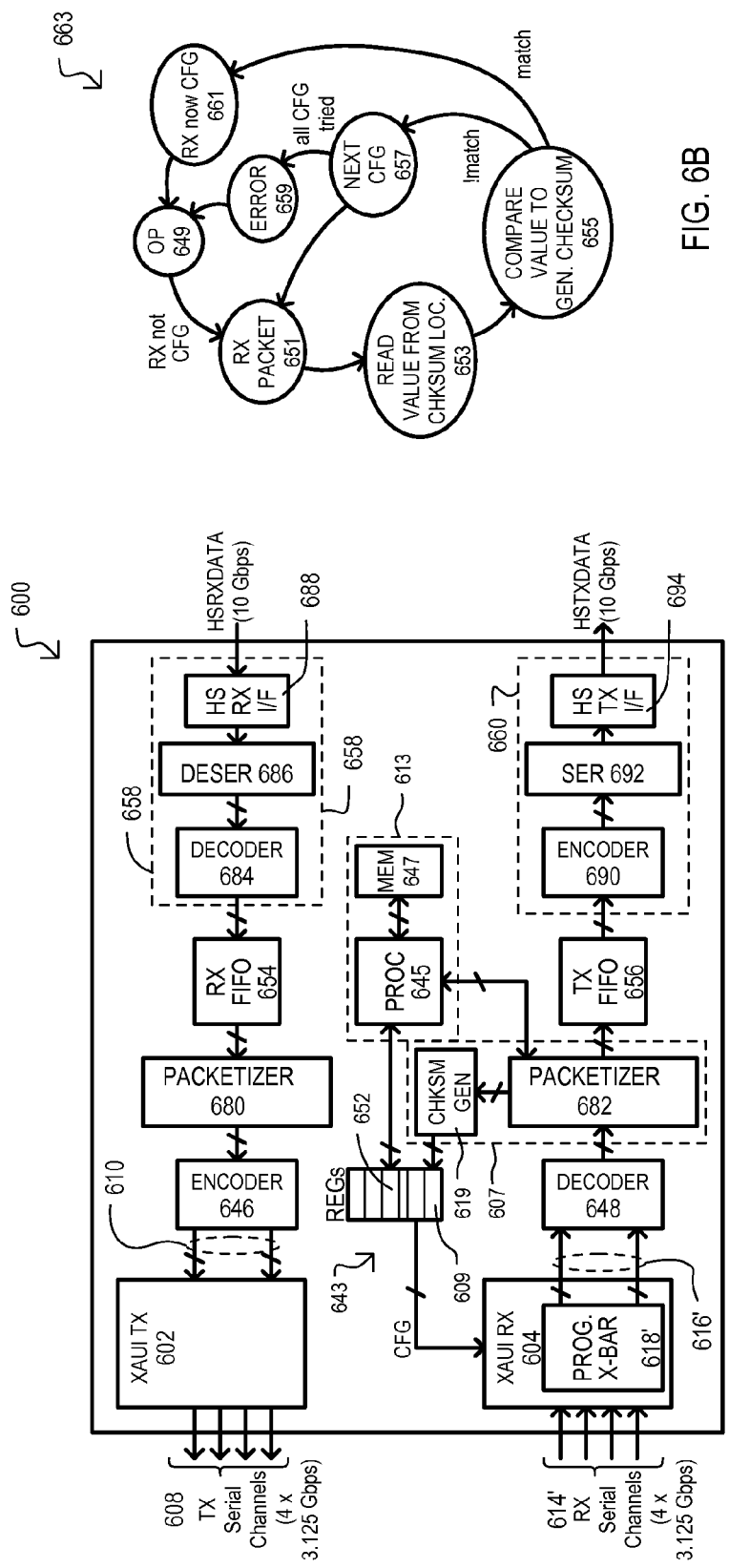
FIGS. 6A and 6B are diagrams showing an IC device according to one embodiment having an automatically reconfigurable XAUI RX port.

Referring now to FIGS. 6A and 6B, an IC device according to an additional embodiment is shown in a block schematic diagram and a corresponding state diagram. An IC device 600 can include a TX port 602, an RX port 604, and a data organizer 607. An IC device 600 can be one very particular implementation of any of those shown in FIGS. 1A/B, 2, 3, 4A/B or 5A/B.

Referring now to FIG. 6A, an IC device 600 can include a XAUI type interface. Accordingly, TX and RX interfaces (602 and 604) can be XAUI interfaces, providing four serial TX channels and four serial RX channels operating at 3.125 Gbps. In response to configuration data provided from configuration store 652, mapping circuit 618 can be configured to map RX data connections 614 to second internal data lanes 616 according to any of multiple configurations.

IC device 600 also shows a controller 613 implemented as a processor 645 and memory 647. That is, controller 613 can include processor 645 configured to execute instructions within memory 647 to configure mapping circuit 618 as described herein, or an equivalent. Further, processor 645 can confirm a correct TX lane configuration by a comparison between a generated ODV and a data location storing received input data.

An IC device 600 can further include a register set 643, which can have one or more register locations operating as a configuration store 652, as well as one or more registers operating as an organizer store 609.

IC device 600 can further include processing circuits that include encoder circuits 646 and decoder circuits 648. Encoder circuits 646 can encode data prior to transmission from TX port 602. In very particular embodiments, encoding circuits 646 can be 8b/10b encoders that encode a logical stream of eight bit values into 10-bit values, along with 10-bit control codes. Decoder circuits 648 can decode data received on multiple serial data streams from RX port 604. In very particular embodiments, decoder circuits can be 10b/8b decoders that decode 10 bit data and control code values into 8-bit data values and control codes.

An data organizer 607 can include a packetizer circuit 682 which can organize packets of data provided by a decoder 648. The organization can be based on which internal data lanes 616 the data is received on. A checksum generator 619 can generate a checksum value (e.g., an error check code) from received packet data. A generated checksum value can be stored in organization store 609. Controller 613 can access such a generated checksum value from organization store 609 and compare it with a data value a predetermined location within packetizer circuit 682.

Processing circuits can further include an RX FIFO 654, high speed RX (HSRX) circuits 658, a TX FIFO 656, and high speed TX (HSTX) circuits 660. HSRX circuits 658 can receive serial data and output such data in parallel form for storage in RX FIFO 654. In one embodiment, HSRX circuits 658 can receive serial data on a single connection at a higher bit rate than that transmitted on individual TX data connections 608. In the particular embodiment of FIG. 6A, a HSRX circuit 658 can include a HSRX interface 688, a de-serializer circuit 686 and a decoder 684. A HSRX interface 688 can receive data in a serial data stream transmitted at a higher speed than a XAUI interface connection, which in this case is 10 Gbps. De-serializer circuit 686 can convert such data to parallel form, and decoder 684 can decode such data for input to RX FIFO 654. A first packetizer circuit 680 can be included that logically organizes data in a packet format suitable for transmission over the XAUI transmit port.

In a reverse fashion, a TX FIFO 656 can buffer data from decoding circuits 648 and provide it, in parallel form, to HSTX circuits 660. In some embodiments, HSTX circuits 660 can transmit serial data on a single connection at a higher bit rate than that received on individual RX data connections 614. In the very particular embodiment of FIG. 6A, a second packetizer circuit 682 can organize data from decoder 648 into a packet format suitable for transmission over the HSTX interface 694, and provide such data to TX FIFO 656. Encoder 690 can encode data from TX FIFO 656, and such encoded data can be serialized by serializer circuit 692 for output on HSTX interface 694 at a speed greater than that of RX connections 614 (which in this particular embodiment is 10 Gbps).

Referring now to FIG. 6B, a configuration for a controller like that shown as 613 is shown in a state diagram 663. A configuration 663 can include a state 649, which can be a predetermined operational state, like that described for other embodiments, or equivalents. If it is determined that an RX path is not configured (RX not CFG), a controller can wait for the reception of a data packet (651). Once a data packet is received, a data value can be read from an expected checksum location (653). An expected checksum location can be a location that would store a checksum value for the received packet if the RX paths are properly configured. A value read from the expected checksum location can be compared to a generated checksum value (655). If the read data value does not match the generated checksum (!match), a next configuration value can be written to a configuration store (657), and operations can return to state 651. If the read data value matches the generated checksum (match), an RX path can be considered to be configured (661) and operations can return to state (649).

Referring now to FIGS. 7A and 7B, an IC device according to a further embodiment is shown in a block schematic diagram and a corresponding state diagram. An IC device 700 can include sections like that of FIG. 6A, and like sections are referred to by the same reference character.

FIG. 7A can differ from FIG. 6A in that a TX port 702 can include a second mapping circuit 712 that can map first internal data lanes 610 to TX data connections 608 in response to configuration data CFG stored in configuration store 652. In addition, a processor 745, configurable according to instructions within memory 745, can cause packetizer 780 to generate dummy packets as described herein, and equivalents. Further, processor 745 can monitor packetizer 682 to determine when valid packet data is received on RX data connections 614.

Referring now to FIG. 7B, a configuration for a controller like that shown as 713 is shown in a state diagram 765. A configuration 765 can include a state 767, which can be a predetermined operational state, like that described for other embodiments, or equivalents. If it is determined that a TX path is not configured (TX not CFG), a controller can cause dummy packets to be transmitted (769). If a receiving device acknowledges the receipt of the dummy packets (RX ACK), a TX path can be determined to be properly configured (771). An RX path can then be configured as described in other embodiments herein (773), and operations can return to a state 767. If a receiving device does not acknowledge the receipt of the dummy packets (!RX ACK), next configuration data can be written to a configuration register (775) to cause a second mapping circuit 712 to remap TX paths, and operations can return to state 769.

While FIGS. 6A and 7A show embodiments with XAUI interfaces, alternate embodiments can include reduced XAUI (RXAUI) interfaces, having two RX and two TX data connections, each operating at 6.25 Gbps.

While embodiments above have included IC devices, other embodiments may include systems incorporating such IC devices. Particular examples of such embodiments will now be described.

Referring now to FIG. 8A, a method 881 for mapping TX and RX lanes according to another embodiment is shown in a diagram. A method 881 can enable automatic reconfiguration of RX and TX ports of a first device in communication with a second device, whether or not the second device has a corresponding automatic reconfiguration capability.

The method is set forth as in FIG. 8A is described in "pseudocode," a broad way of expressing the various steps in a method. The pseudocode may be implemented into particular computer language code versions for use in a system employing a general or specialized processor. In addition, the described method can be implemented in a higher level hardware designing language, to enable the preferred embodiment to be realized as an application specific integrated circuit (ASIC) or a portion of an ASIC, or a programmable logic device.

A method 881 can include, while monitoring received data for particular messages (where the messages contain multiple message parts in a predetermined order), transmitting a predetermined message (shown as message parts msg1 msg2 msg3 msg4) (shown in lines 1-2). While such monitoring occurs, an RX port can be manipulated (e.g., RX channels can be cycled after data has been received and determined not to include a valid message) (shown in line 3).

If a first message (i.e., message parts msg1 msg2 msg3 msg4) is received (having the correct order), but a second message (shown as message parts msg5 msg6 msg7 msg8) has not been received, a method 881 may continue monitoring for the second message (i.e., reception of the second message in the proper order) (shown as lines 5-7). Such an action can indicate that an RX port is properly configured, but a TX port is not yet configured. Accordingly, a second message (msg5 msg6 msg7 msg8) can be transmitted, while a TX port can be manipulated (shown in line 7).

Once a second message has been received, it is understood that both RX and TX ports are properly configured, and regular traffic can be commenced (shown in line 9).

Figure 8E:
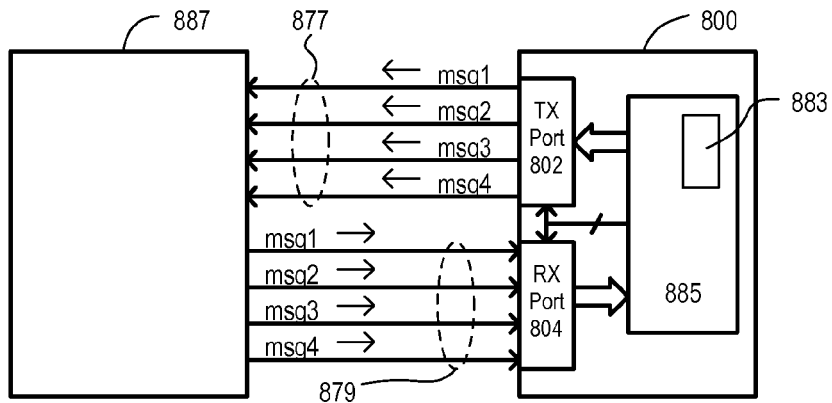
Figure 8F:
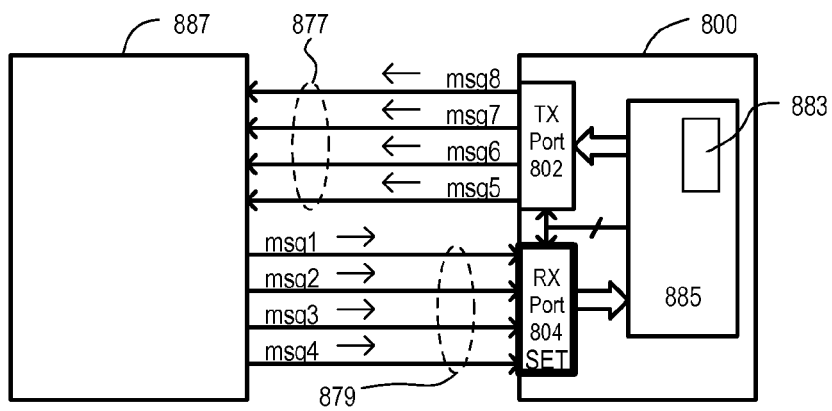
Figure 8G:
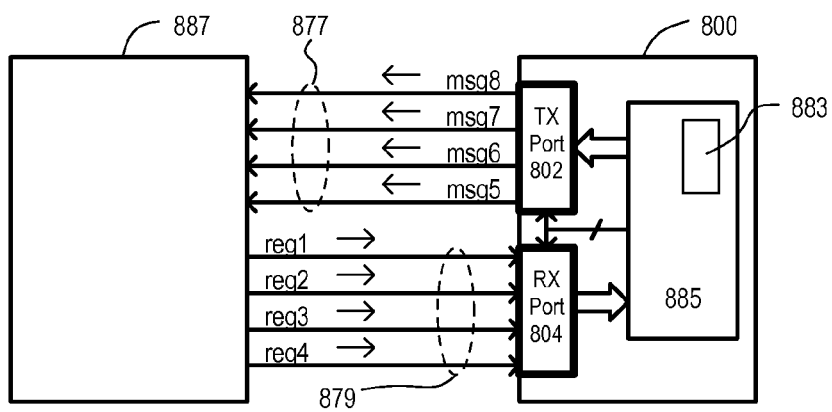

FIGS. 8B to 8G are block diagrams showing configuration operations according to a method like that shown in FIG. 8A. In particular, FIGS. 8B to 8D show a configuration operation for devices that both include an automatic configuration capability. In contrast, FIGS. 8E to 8G show a configuration operation where only one device has the automatic configuration capability. However, in both cases, a first device 800 can operate according to a same configuration sequence (e.g., method 881).

FIGS. 8B to 8D show a first device 800 connected to a second device 800' by first lines 877 and second lines 879. Both devices 800/800' can include an RX port 804/804' and a TX port 802/802' as described herein, or equivalents. Further, both devices 800/800' can include a control section 885/885'. Control sections 885/885' can include a controller and data organizer as shown in other embodiments herein, and equivalents. In the particular embodiment shown, control sections 885/885' can store instructions 883/883' for executing the method shown.

Referring to FIG. 8B, both devices 800/800' can monitor received data while transmitting a first message (msg1 msg2 msg3 msg4) and manipulating their respective RX ports 804/804'.

In FIG. 8C, first device 800 has successfully received a first message, thus RX port 804 can be considered to have a correct mapping (SET). Accordingly, first device 800 can begin to transmit second message (msg5 msg6 msg7 msg8).

In FIG. 8D, second device 800' has successfully received a second message, thus its RX and TX ports 804'/802' can be considered to have a correct mapping (SET). Second device 800' has not yet received regular traffic, so it can begin to transmit the second message (msg5 msg6 msg7 msg8).

Upon receiving the second message from second device 800', first device 800 can commence regular traffic.

FIGS. 8E to 8G show a first device 800 connected to a second device 887 by first lines 877 and second lines 879. It is understood that second device 887 does not include remappable RX or TX ports. However, second device 887 can execute the method 881 shown in FIG. 8A, but does not manipulate an RX mapping or TX mapping (i.e., lines 3 and 7 are not performed). First device 800 can have the sections like those shown in FIGS. 8B to 8D.

Referring to FIG. 8E, both devices 800/887 can monitor received data while transmitting a first message (msg1 msg2 msg3 msg4). First device 800 can manipulate its RX port 804.

In FIG. 8F, first device 800 has successfully received a first message, thus its RX port 804 can be considered correct (SET). Accordingly, first device 800 can begin to transmit second message (msg5 msg6 msg7 msg8). In addition, TX port 802 can be manipulated.

In FIG. 8G, second device 887 has successfully received a second message, and so commences regular traffic (shown as reg1 reg2 reg3 reg4). Upon receiving such regular traffic, first device 800 can consider its TX port 802 as being correct (SET), and itself can commence regular traffic.

It is understood that the messages shown in FIGS. 8A to 8G can be selected types of regular traffic messages. That is, regular traffic can be composed of data values interspersed with control values. Selected of control values could be used to form an expected message. For example, in one very particular embodiment, such messages can include regular PING messages commonly used in Ethernet/IP type traffic.

Figure 8H:
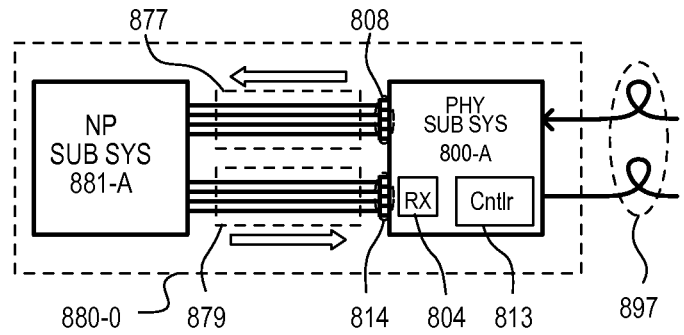

Referring now to FIG. 8H, a system according to one embodiment is shown in a block schematic diagram and designated by the general reference character 880-0. System 880-0 can include physical layer (PHY) subsystem 800-A connected to a network processor (NP) subsystem 881-A by a first set of lines 877 and a second set of lines 879. A PHY subsystem 800-A can provide a physical interface to a transmission medium 897 to receive and transmit packet data. PHY subsystem 800-A can include an RX port 804 that is configurable by a controller 813 as described for embodiments herein, or equivalents. Accordingly, regardless of a physical ordering of the second set of lines 879 established by NP subsystem 881-A, PHY subsystem 800-A can logically reorder RX data connections 814 to ensure proper ordering of received data.

In the particular embodiment shown, first set of lines 877 can provide unidirectional, point-to-point connections to enable serial data transmission between TX data connections 808 and NP subsystem 881-A. Similarly, second set of lines 879 can provide unidirectional, point-to-point connections to enable serial data transmission from NP subsystem 881-A to RX data connections 814.

A NP subsystem 881-A can process packet data received over medium 897, and prepare packet data for transmission on medium 897.

A PHY subsystem 800-A can be composed of multiple, or a single integrated circuit package. In a particular embodiment, first and second sets of lines (877 and 879) can be transmission line traces formed on a circuit board.

In this way, a physical layer device can automatically reorder receive data connections in response to a data value received within a data packet.

Figure 8I:
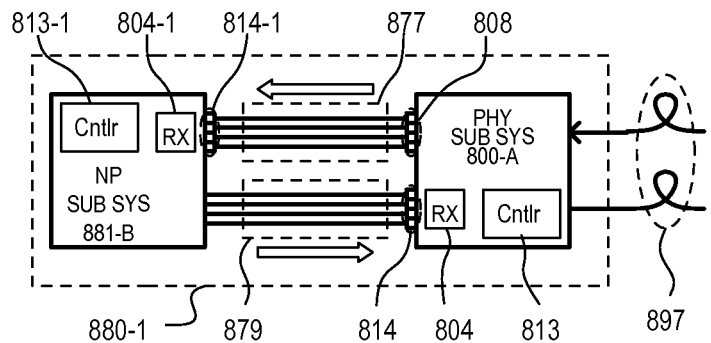

Referring now to FIG. 8I, a system according to another embodiment is shown in a block schematic diagram and designated by the general reference character 880-1. System 880-1 can include items like those of FIG. 8H. Such like items are referred to by the same reference characters, and a description of their composition and operation is understood from the description of FIG. 8H.

FIG. 8I differs from FIG. 8H in that an NP subsystem 881-B can include its own configurable RX port 804-1 and controller 813-1. Thus, while PHY subsystem 800-A can automatically configure its receive connections 814 to accommodate a physical ordering of signals transmitted from NP subsystem 881-B, in a like fashion, NP subsystem 881-B can automatically configure its receive connections 814-1 to accommodate a physical ordering of the TX data connections 808 of PHY subsystem 800-A.

In this way, a first device can automatically reorder data connections that receive data from a second device, in response to a data value received within a packet, while the second device can automatically reorder data connections that receive data from the first device, also in response to a data value received within a packet.

Figure 8J:
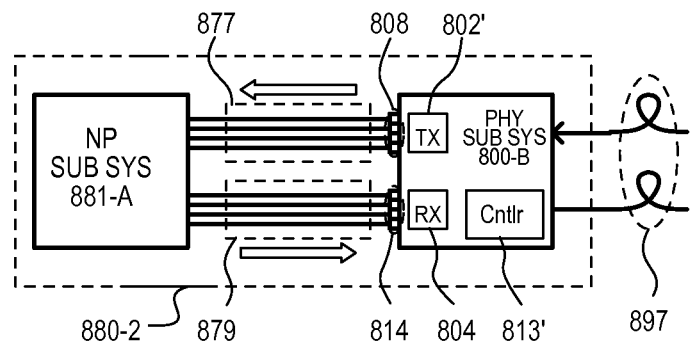

Referring now to FIG. 8J, a system according to another embodiment is shown in a block schematic diagram and designated by the general reference character 880-2. System 880-2 can include items like those of FIG. 8H. Such like items are referred to by the same reference characters, and a description of their composition and operation is understood from the description of FIG. 8H.

FIG. 8J differs from FIG. 8H in that PHY subsystem 800-A can include a TX port 802' that is configurable by a controller 813' as described herein, or equivalents.

In this way, a physical layer device can automatically reorder transmit-data connections and receive-data connections in response to a data value received within a data packet.

While the embodiments above have shown devices, systems and methods, additional methods will now be described with reference to FIGS. 9 to 11.

Figure 9:
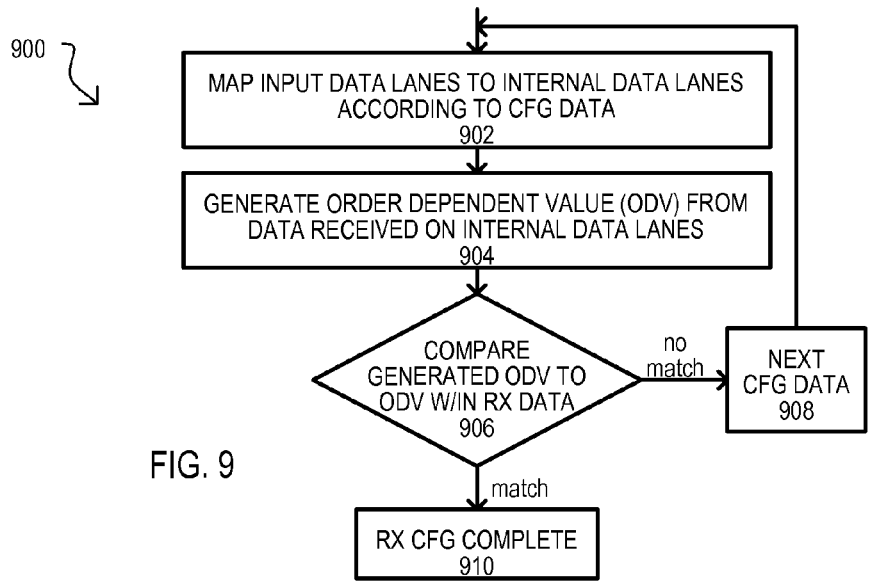
FIG. 9 is a flow diagram of an RX port configuration method according to an embodiment.

Referring now to FIG. 9, a method according to a first embodiment is shown in a flow diagram and designated by the general reference character 900. The method 900 can include mapping input data lanes to internal data lanes according to configuration data (902). An order dependent value (ODV) can be generated from data received on such multiple internal data lanes (904). The generated ODV can be compared to an ODV included within the received data (906). If such values do not match (no match), a next configuration data value can be generated (908), and the method can return to (902). If such values do match (match), an RX configuration operation can be considered complete (910).

In particular embodiments, actions shown in box 902 can be performed by an RX port, such as those shown as 104, 204, 304', 504', 604, 604', 804/804' in embodiments above, or by an equivalent structure. Actions shown in box 904 can be performed by a data organizer and/or code generator, such as those shown as 107, 207 219, 507, 619 in the embodiments above, or by an equivalent structure. Any or all of operations shown as 906, 908 or 910 can be performed by a controller and/or control section, such as those shown as 113, 413, 513, 613, 713, 885, 885', 813 or 813' in the embodiments above, or by an equivalent structure.

Figure 10:
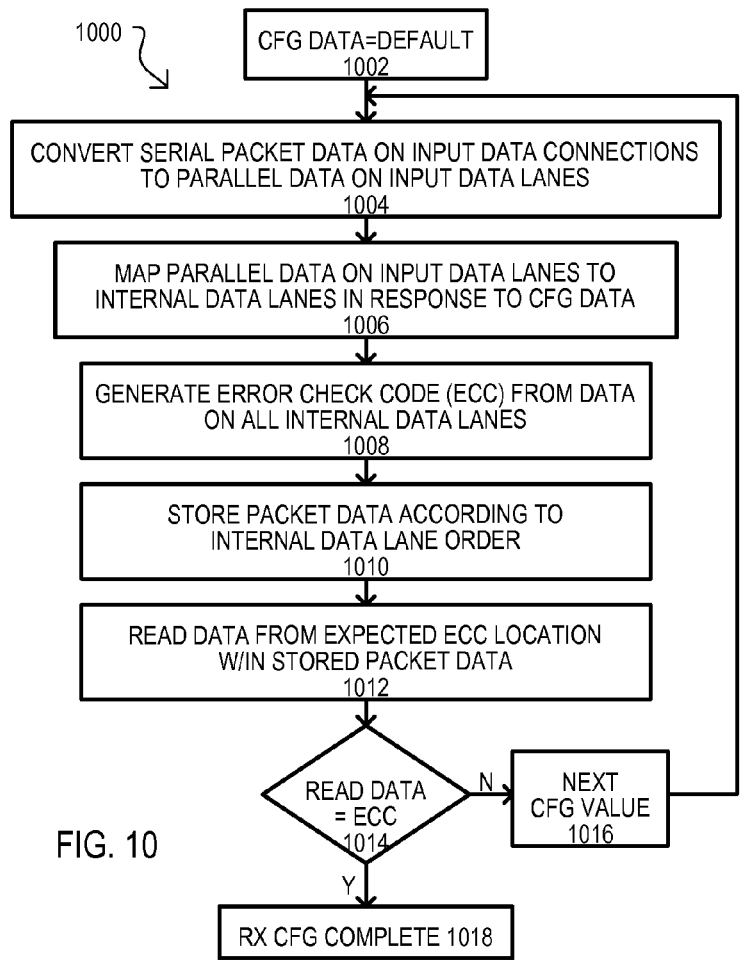
FIG. 10 is a flow diagram of an RX port configuration method according to another embodiment.

Referring now to FIG. 10, another method according to an embodiment is shown in flow diagram and designated by the general reference character 1000. The method 1000 can include setting a configuration data value to a default value (1002). Serial packet data received on multiple input data connections can be converted to parallel data on input data lanes (1004). Parallel data on input data lanes can be mapped to internal data lanes in response to the configuration data (1006).

One or more error check codes (ECGs) can be generated from data on the internal data lanes (1008). Packet data can be stored according to internal data lane order (1010). A data value can be read from an expected ECC location within the stored packet data (1012). An expected ECC location can be a location that would store an ECC value embedded with the packet data, if the lane mapping is correct. If the read data does not match the generated ECC (N from 1014), a configuration value can be changed, and the method can return to 1004. If the read data matches the generated ECC (Y from 1014), a receive configuration operation can be determined to be complete (1018).

In particular embodiments, actions shown in box 1002 can be performed by a controller and/or control section, such as those shown as 113, 413, 513, 613, 713, 885, 885', 813 or 813' in the embodiments above, or by an equivalent structure. Actions shown in boxes 1004 or 1006 can be performed by an RX port, such as those shown as 104, 204, 304', 504', 604, 604' or 804/804' in embodiments above, or by an equivalent structure. Actions shown in boxes 1008 or 1010 can be performed by a data organizer and/or code generator, such as those shown as 107, 207 219, 507 or 619 in the embodiments above, or by an equivalent structure. Any or all of operations shown as 1012, 1014, 1016 or 1018 can be performed by a controller and/or control section, such as those shown as 113, 413, 513, 613, 713, 885, 885', 813 or 813' in the embodiments above, or with an equivalent structure.

Figure 11:
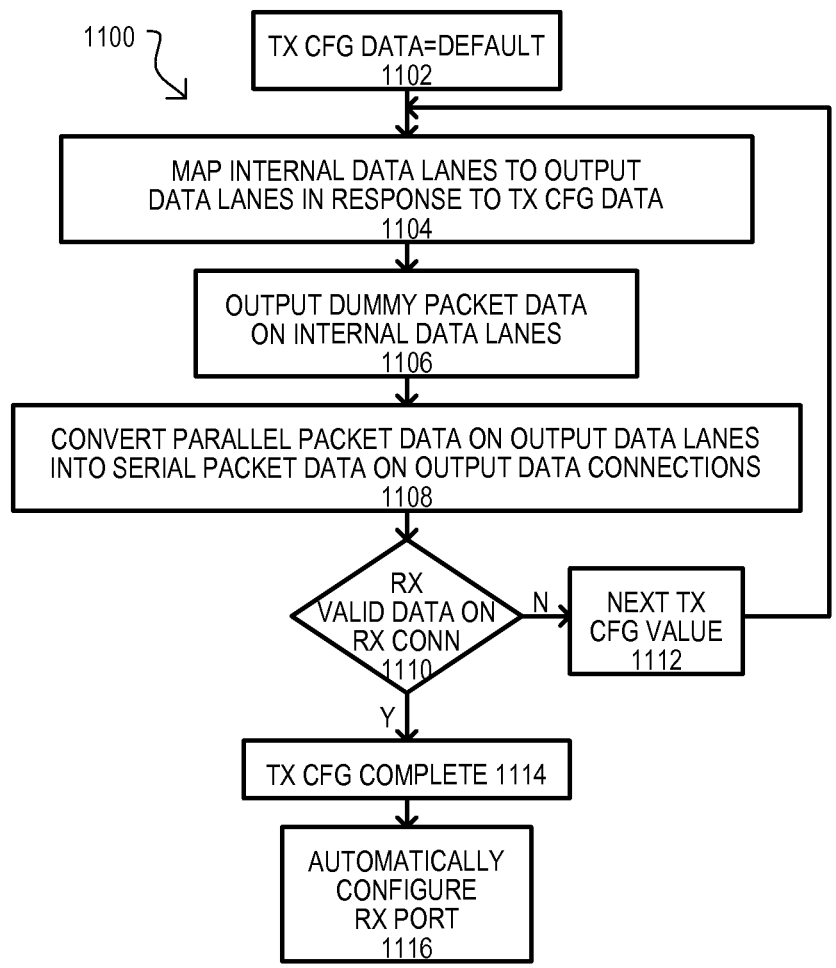
FIG. 11 is a flow diagram of a TX and RX port configuration method according to an embodiment.

Referring now to FIG. 11, another method according to an embodiment is shown in flow diagram and designated by the general reference character 1100. The method 1100 can include setting a TX configuration data value to a default value (1102). Data on internal data lanes can be mapped to output data lanes in response to the TX configuration data (1104). Dummy packet data can be output on internal data lanes (1106). Such an action can result in dummy packet data being mapped to output data lanes according to TX configuration data. Parallel packet data on output data lanes can be converted to serial packet data that is output on output data connections (1108).

If valid data is not received on receive data connections (N from 1110), a next TX configuration value can be selected (1112), and the method can return to 1104. If valid data is received on receive data connections (Y from 1110), the method may automatically configure an RX port 1116.

In particular embodiments, actions shown in box 1102 can be performed by a controller and/or control section, such as those shown as 113, 413, 513, 613, 713, 885, 885', 813 or 813' in the embodiments above, or by an equivalent structure. Actions shown in any or all of 1104, 1106 or 1108, can be performed by a TX port, such as those shown as 502', 702, 802 or 802' in embodiments above, or by an equivalent structure.

Any or all of operations shown as 1110, 1112, 1114 or 1116 can be performed by a controller and/or control section, such as those shown as 113, 413, 513, 613, 713, 885, 885', 813 or 813' in the embodiments above, or by an equivalent structure.

Figure 12A:
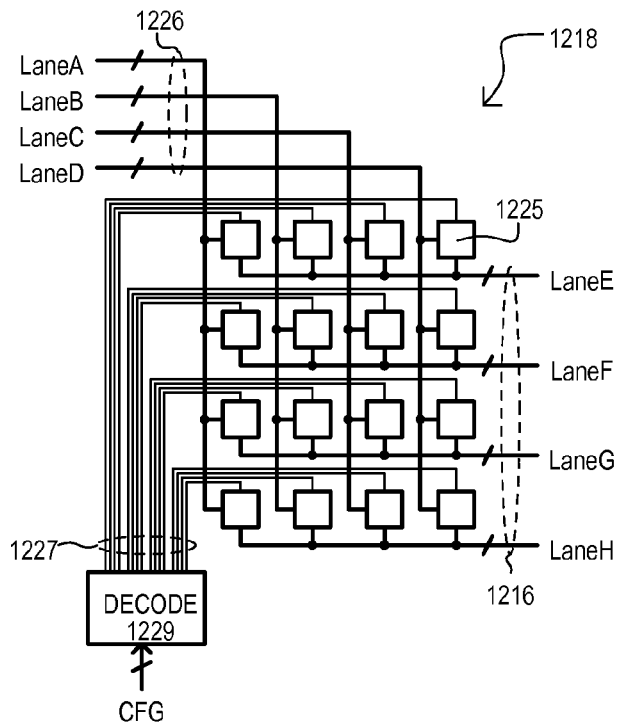
FIGS. 12A and 12B are block schematic diagrams of crossbar circuits that can be included in embodiments.
Figure 12B:
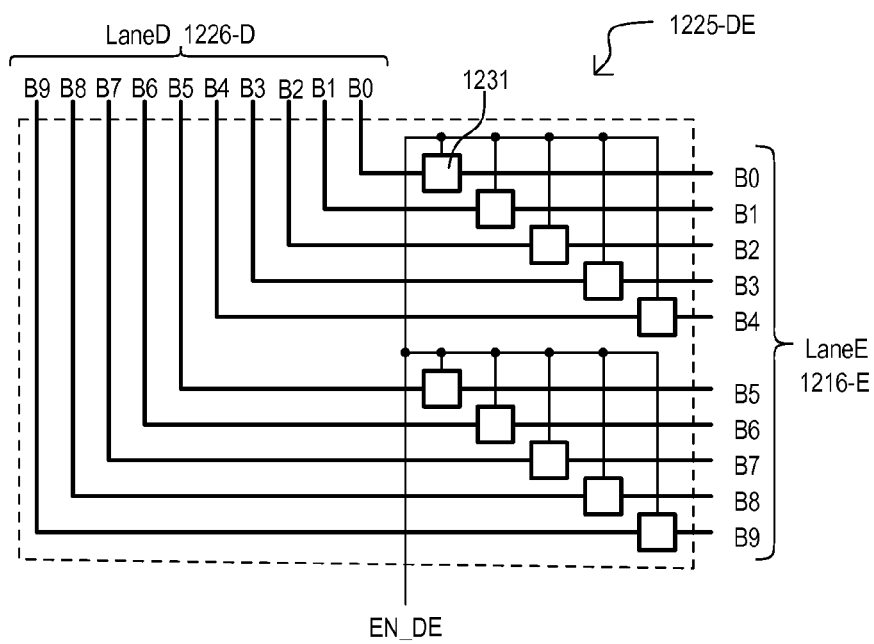

Referring now to FIGS. 12A and 12B, one very particular example of a crossbar mapping circuit that can be included in the embodiments is shown in a block schematic diagram and designated by the general reference character 1218. Referring to FIG. 12A, mapping circuit 1218 can map a first set of data lanes 1226 to a second set of data lanes 1216. Switch sets (one shown as 1225) can be formed at the intersections of data lanes from the different sets. Each switch set (e.g., 1225) can be enabled to conductively connect lanes to one another by enable signals. In the embodiment shown, a decoder circuit 1229 can generate enable signals for each switch set (e.g., 1225) on enable signal lines 1227.

Referring to FIG. 12B, one particular example of a switching set that can be included in a mapping circuit like that of FIG. 12A, is shown in a block schematic diagram and designated by the general reference character 1225-DE. In the embodiment shown, switch set 1226-DE can connect a 10-bit data lane 1226-D to another 10-bit data lane 1216-E. Switch elements (one shown as 1231) can connect one of multiple lines (B0 to B9) from each data lane to a corresponding line of the other data lane. All switch elements (e.g., 1231) can be commonly enabled (e.g., provide a conductive path) by an enable signal EN_DE.

It is understood that the particular mapping circuit shown in FIGS. 12A and 12B represents but one implementation of a mapping circuit that may be included in the embodiments.

It should be appreciated that in the foregoing description of exemplary embodiments, various features are sometimes grouped together in a single embodiment, figure, or description thereof for the purpose of streamlining the disclosure. This method of disclosure, however, is not to be interpreted as reflecting an intention that embodiments require more features than are expressly recited in each claim. Rather, as the following claims reflect, some embodiments may include less than all features of a single foregoing disclosed embodiment. Thus, the claims following the detailed description are hereby expressly incorporated into this detailed description, with each claim standing on its own as one or more separate embodiments of this invention.

It is also understood that embodiments may be practiced in the absence of an element and/or step not specifically disclosed. That is, an inventive feature can be elimination of an element.

Accordingly, while the various aspects of the particular embodiments set forth herein have been described in detail, other embodiments could be subject to various changes, substitutions, and alterations without departing from the spirit and scope of the disclosure.

What is claimed is:

1. An integrated circuit, comprising:
a receive (RX) port, including a mapping circuit, configurable to map N input data lanes to at least N first internal data lanes, in an order that corresponds to configuration data, according to one of a plurality of different combinations in response to configuration data, where N is an integer greater than one;
a data organizer, coupled to the output of the mapping circuit, programmed to store a data set received on the internal data lanes according to the order of the first internal data lanes, and to generate a first value from the data set according to a received order of data in the data set; and
a controller programmed to compare the first value to a second value stored at a predetermined storage location.

2. The integrated circuit of claim 1, wherein:
the controller is further programmed to change the configuration data in response to the first value not matching the second value.

3. The integrated circuit of claim 1, wherein:
the controller comprises a processor programmed to read the second value from the data organizer, and compare the second value to the first value.

4. The integrated circuit of claim 1, wherein:
the data organizer comprises a memory configured to store the data set, and
a code generator circuit programmed to generate the first value from at least a portion of the data set.

5. The integrated circuit of claim 4, wherein:
the data set comprises a data packet; and
the code generator circuit comprises an error check code (ECC) generator to generate an ECC value for a received data packet.

6. The integrated circuit of claim 1, wherein:
the mapping circuit comprises a programmable crossbar circuit having switching elements at intersections of the input data lanes and first internal data lanes, the switching elements being enabled in response to the configuration data.

7. The integrated circuit of claim 1, wherein:
the RX port is configured to activate a data received indication in response to receiving valid input signals;
the integrated circuit further comprises a transmit (TX) configurable to map M second internal data lanes to M output data lanes according to one of a plurality of different combinations in response to the configuration data, where M is an integer greater than one; and the controller is programmed to generate predetermined data values for transmission through the TX port in response to at least one predetermined event.

8. The integrated circuit of claim 7, wherein:
the controller is further programmed to change the configuration data stored in a configuration store until at least the activation of the data received indication, and stop the generation of the predetermined data values upon activation of the data received indication.

9. The integrated circuit of claim 1, wherein:
the data organizer comprises the predetermined storage location for storing the second value.

10. The integrated circuit of claim 1, wherein:
the integrated circuit further comprises a configuration store to store the configuration data.

11. A method, comprising:
receiving data at a receive port of an integrated circuit;
mapping the data so that the data is provided onto first internal data lanes;
storing the data received on the first internal data lanes in a memory;
comparing a data value stored at a predetermined location in the memory to an order-dependent value generated from at least a portion of the data received, the order-dependent value being dependent or a mapping of input data lanes to the first internal data lanes; and
if the order-dependent value does not match the data value, changing the mapping of the input data lanes to the first internal data lanes.

12. The method of claim 11, wherein:
storing the data received on the first internal data lanes in the memory comprises storing a packet of data with an internal error check value; and the order-dependent value is a generated error check value;
wherein the order-dependent value is determined to match the data value if the internal error check value is stored at the predetermined location.

13. The method of claim 11, further comprising:
outputting predetermined values on second internal data lanes; and
if valid input signals are not detected, changing a mapping of the second internal data lanes to output data lanes.

14. A system, comprising:
at least a first integrated circuit (IC) comprising:
    first receive (RX) data connections coupled to first lines;
    first transmit (TX) data connections coupled to second lines;
    a first RX port, responsive to first configuration data, configured to assign one of a plurality of different logical orders to at least the first RX data connections,
a TX port, responsive to the first configuration data, programmed to assign one of plurality of different logical orders to at least the first TX data connections; and
a first controller programmed to alter the first configuration data in response to a comparison between a data value having a predetermined location within a received data set, and an order-dependent value generated from at least a portion of the received data set, and the first controller is further programmed to enable transmission of predetermined data over the first TX data connections and stop the transmission of the predetermined data in response to the first RX port detecting input signals.

15. The system of claim 14, further including:
a second IC comprising:
second TX data connections coupled to the first lines;
second RX data connections coupled to the second lines;
a second RX port, responsive to second configuration data, programmed to assign one of a plurality of different logical orders to at least the second RX data connections, and
a second controller programmed to alter the second configuration data in response to a comparison between a data value having a predetermined location within a received data set and an order-dependent value generated from at least a portion of the received data set.

16. The system of claim 15, wherein:
the first lines are point-to-point connections that provide direct, conductive connections between the first RX data connections and the second TX data connections; and
the second lines are point-to-point connections that provide direct, conductive connections between the first TX data connections and the second RX data connections.

\* \* \* \* \*

UNITED STATES PATENT AND TRADEMARK OFFICE
CERTIFICATE OF CORRECTION

PATENT NO.         : 8,612,663 B1                                        Page 1 of 1
APPLICATION NO.    : 13/192381
DATED              : December 17, 2013
INVENTOR(S)        : Lee et al.

It is certified that error appears in the above-identified patent and that said Letters Patent is hereby corrected as shown below:

In the Claims

Claim 2, Column 14, Line 4
Replace "the controller is farther" with --the controller is further--.

Claim 7, Column 14, Line 30
Replace "a transmit (TX)" with --a transmit (TX) port--.

Signed and Sealed this
Eleventh Day of March, 2014

Michelle K. Lee
*Deputy Director of the United States Patent and Trademark Office*